United States Patent
Heybroek et al.

(10) Patent No.: US 11,186,966 B2
(45) Date of Patent: Nov. 30, 2021

(54) POWER SYSTEM FOR A WORK MACHINE

(71) Applicant: Volvo Construction Equipment AB, Eskilstuna (SE)

(72) Inventors: Kim Heybroek, Kvicksund (SE); Karl Uebel, Eskilstuna (SE)

(73) Assignee: Volvo Construction Equipment AB, Eskilstuna (SE)

( * ) Notice: Subject to any disclaimer, the term of this patent is extended or adjusted under 35 U.S.C. 154(b) by 438 days.

(21) Appl. No.: 16/304,240

(22) PCT Filed: May 30, 2016

(86) PCT No.: PCT/SE2016/050504
§ 371 (c)(1),
(2) Date: Nov. 23, 2018

(87) PCT Pub. No.: WO2017/209664
PCT Pub. Date: Dec. 7, 2017

(65) Prior Publication Data
US 2020/0318318 A1 Oct. 8, 2020

(51) Int. Cl.
*E02F 9/22* (2006.01)
*B60K 25/02* (2006.01)
(Continued)

(52) U.S. Cl.
CPC ............... *E02F 9/22* (2013.01); *B60K 25/02* (2013.01); *E02F 3/422* (2013.01); *E02F 9/2225* (2013.01);
(Continued)

(58) Field of Classification Search
CPC .... F16H 61/4096; E02F 3/422; E02F 9/2221; E02F 9/2225; B60K 6/12; B60K 6/00
See application file for complete search history.

(56) References Cited

U.S. PATENT DOCUMENTS

| 4,581,949 A * | 4/1986 | Mann ..................... B60K 17/04 180/53.2 |
| 5,809,846 A | 9/1998 | Ohkura et al. |

(Continued)

FOREIGN PATENT DOCUMENTS

| AT | 506883 A2 | 12/2009 |
| DE | 2422997 A1 | 11/1975 |

(Continued)

OTHER PUBLICATIONS

Extended European Search Report dated Dec. 11, 2019 for European Patent Application No. 16904179.5, 6 pages.
International Search Report and Written Opinion of the International Searching Authority, PCT/SE2016/050504, dated Feb. 1, 2017, 14 pages.

*Primary Examiner* — Abiy Teka
(74) *Attorney, Agent, or Firm* — Sage Patent Group

(57) ABSTRACT

The invention relates to a system for a work machine. The power system comprises a power-split continuously variable transmission for propulsion of the work machine and a hydraulic system for work hydraulics. The power-split continuously variable transmission has a hydrostatic branch and a mechanical branch. The hydrostatic branch comprises a first hydraulic machine and a second hydraulic machine. The hydrostatic branch comprises a first control valve fluidly connected to the first hydraulic machine and to the second hydraulic machine for controlling the flow of hydraulic fluid between the first hydraulic machine and the second hydraulic machine. The hydraulic system comprises at least one hydraulic actuator fluidly connected to a first port of the first hydraulic machine, and a second control valve for controlling the flow of hydraulic fluid to said at least one hydraulic actuator.

19 Claims, 9 Drawing Sheets

(51) Int. Cl.
*E02F 3/42* (2006.01)
*F15B 11/16* (2006.01)
*F16H 47/04* (2006.01)
*F16H 61/4078* (2010.01)
*F16H 61/438* (2010.01)
*E02F 3/28* (2006.01)

(52) U.S. Cl.
CPC .......... *E02F 9/2267* (2013.01); *E02F 9/2271* (2013.01); *E02F 9/2275* (2013.01); *E02F 9/2292* (2013.01); *E02F 9/2296* (2013.01); *F15B 11/165* (2013.01); *F16H 47/04* (2013.01); *F16H 61/4078* (2013.01); *F16H 61/438* (2013.01); *B60K 2025/026* (2013.01); *B60Y 2200/415* (2013.01); *E02F 3/283* (2013.01); *F15B 2211/20538* (2013.01); *F15B 2211/20546* (2013.01); *F15B 2211/20561* (2013.01); *F15B 2211/25* (2013.01); *F15B 2211/7053* (2013.01); *F15B 2211/71* (2013.01)

(56) References Cited

U.S. PATENT DOCUMENTS

| | | |
|---|---|---|
| 2006/0145482 A1 | 7/2006 | Roethler et al. |
| 2007/0026989 A1 | 2/2007 | Swick et al. |
| 2009/0227410 A1 | 9/2009 | Zhao et al. |
| 2010/0242464 A1 | 9/2010 | Vigholm et al. |
| 2013/0098015 A1 | 4/2013 | Opdenbosch |

FOREIGN PATENT DOCUMENTS

| | | | |
|---|---|---|---|
| DE | 3815780 A1 | 12/1988 | |
| DE | 102004048475 A1 * | 4/2006 | ......... F16H 61/4035 |
| DE | 102004048475 A1 | 4/2006 | |
| EP | 0911546 A1 | 4/1999 | |
| EP | 3021012 A1 | 5/2016 | |
| JP | 1137250 A | 2/1999 | |
| WO | WO 2014196905 A1 | 12/2014 | |

* cited by examiner

POWER SYSTEM FOR A WORK MACHINE

CROSS REFERENCE TO RELATED APPLICATION

This application is a 35 U.S.C. § 371 national stage application of PCT International Application No. PCT/SE2016/050504, filed on May 30, 2016, the disclosure and content of which is incorporated by reference herein in its entirety.

TECHNICAL FIELD

The invention relates to a power system comprising a power-split continuously variable transmission for propulsion of a work machine and a hydraulic system for work hydraulics, and to a work machine comprising such a power system.

The invention can be applied on different types of work machine, for example wheel loaders and articulated haulers. Although the invention will be described hereinafter with respect to a wheel loader, the application of the invention is not restricted to this particular application, but the invention may also be used in other construction equipment and heavy work machines.

BACKGROUND OF THE INVENTION

A work machine is provided with a bucket, container or other type of implement for digging, lifting, carrying and/or transporting a load. A work machine may be operated with large and heavy loads in areas where there are no roads, for example for transports in connection with road or tunnel building, sand pits, mines and similar environments.

A work machine is also typically provided with an internal combustion engine for propulsion of the work machine via a gearbox, and for providing power to a hydraulic system for work hydraulics. The work hydraulics can include different functions, such as steering and movement of an implement.

For example, a wheel loader has a lift arm unit for raising and lowering an implement, such as a bucket. The lift arm unit comprises hydraulic cylinders for movement of a load arm and the implement attached to the load arm. Usually a pair of hydraulic cylinders is arranged for raising the load arm and a further hydraulic cylinder is arranged for tilting the implement relative to the load arm. In addition, the work machine is often articulated frame-steered and has a pair of hydraulic cylinders for steering the working machine by pivoting a front frame and a rear frame of the work machine relative to each other.

The hydraulic system generally further comprises at least one hydraulic pump, which is arranged to supply hydraulic power to the hydraulic cylinders. The hydraulic pump can be driven by a power take-off which can be located between the internal combustion engine and a transmission arrangement, such as a torque converter and gearbox. The transmission arrangement is in turn connected to wheels of the work machine for propulsion of the work machine. In other words; both the hydraulic pump for the work hydraulics and the driveline are directly driven by the internal combustion engine.

There is an increasing interest in improving the energy efficiency of work machines due to the fuel consumption and environmental concerns. A power-split Continuously Variable Transmission (CVT) is known to be a fuel efficient and cost-effective solution for the driveline of construction equipment. Such CVT has a hydrostatic branch and a mechanical branch between which branches the power transmitted by the drive line can be split. The hydrostatic branch often comprises a first hydraulic machine with variable displacement and a second hydraulic machine with variable displacement which hydraulic machines are connected to each other. The mechanical branch comprises a gearbox, preferably including a planetary gear set.

Such power-split transmissions have been suggested for providing a driveline where the torque converter can be replaced. A substantial cost of such a transmission is however related to the high requirements on the hydraulic displacement units of the hydraulic machines.

SUMMARY OF THE INVENTION

An object of the invention is to provide an energy efficient power system at the same time as the machine component cost can be kept relatively low.

This object is achieved by a power system according to claim 1.

The invention is based on the insight that by the provision of a power system for a work machine, where the power system comprises a power-split continuously variable transmission for propulsion of the work machine and a hydraulic system for work hydraulics, and the power-split continuously variable transmission has a hydrostatic branch and a mechanical branch, and the hydrostatic branch comprises a first hydraulic machine and a second hydraulic machine, and the hydrostatic branch comprises a first control valve fluidly connected to the first hydraulic machine and to the second hydraulic machine for controlling the flow of hydraulic fluid between the first hydraulic machine and the second hydraulic machine, and the hydraulic system comprises at least one hydraulic actuator fluidly connected to a first port of the first hydraulic machine, and a second control valve for controlling the flow of hydraulic fluid to said at least one hydraulic actuator, only two hydraulic machines are needed and the second hydraulic machine can be provided with a fixed displacement, since the first hydraulic machine is used both for the transmission and the work hydraulics, and the first control valve can be used for controlling the flow of hydraulic fluid to/from the second hydraulic machine. Furthermore, the control of the output torque from the transmission can be improved, since by means of the first control valve the stiffness of the hydrostatic branch is reduced. The control of the first control valve, a servo-type control valve for instance, is much faster than corresponding actuation of a displacement unit of a hydraulic machine. This is particularly important when shifting modes of a hydro-mechanical transmission. By using clutches the transmission can provide a wide torque/speed range and the sizing requirements of the hydraulic machines can be reduced. Different modes are achieved by engaging and disengaging clutches of the mechanical branch. During a mode shift the operating conditions (speed or torque) of the hydraulic machines may change rapidly. A smooth mode shift without losing tractive capacity, can be achieved by a fast control response of the first control valve instead of controlling a displacement unit of a hydraulic machine that otherwise would be required.

According to one embodiment of the invention, the hydraulic system is a load sensing (LS) system and further comprises a first circuit for providing an LS-pressure for the second hydraulic machine and a second circuit for providing an LS-pressure for said at least one hydraulic actuator, the LS-pressures being provided for controlling the pump pressure of the first hydraulic machine. Hereby, the pump pressure of the first hydraulic machine is adapted to the highest load pressure required by any actuator of the hydraulic system for work hydraulics and the second hydraulic machine. By the use of an LS-system, the power system will be compatible with today's system, where the second hydraulic machine may constitute a load in the same way as the actuators of the work hydraulics making the control of the first hydraulic machine and the flow control relatively uncomplicated. The control of the pump pressure can be performed with any LS-system, for example an electric LS-system or a hydraulic-mechanical LS-system.

According to a further embodiment of the invention, the first control valve and the second control valve are arranged in parallel to each other with respect to a flow of hydraulic fluid from the first port of the first hydraulic machine. This means that the actuator of the hydraulic system for work hydraulics and the second hydraulic machine can be provided with hydraulic fluid from the first hydraulic machine at the same time or one at the time.

According to a further embodiment of the invention, the second hydraulic machine is a combined hydraulic motor and pump. Hereby, the second hydraulic machine can be used both for adding power during driving functioning as a motor and for recovering power during braking functioning as a pump.

According to a further embodiment of the invention, the second hydraulic machine has a design enabling hydraulic flow in two opposite directions. Hereby, an increased number of operating modes of the power system can be achieved.

According to a further embodiment of the invention, the second hydraulic machine has variable displacement. Hereby, the pump pressure of the first hydraulic machine can be adapted to the work hydraulics while the displacement of the second hydraulic machine is controlled to match the current pump pressure so as to reach the desired output power.

This means that for some operation conditions throttling losses of the first control valve can be reduced.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
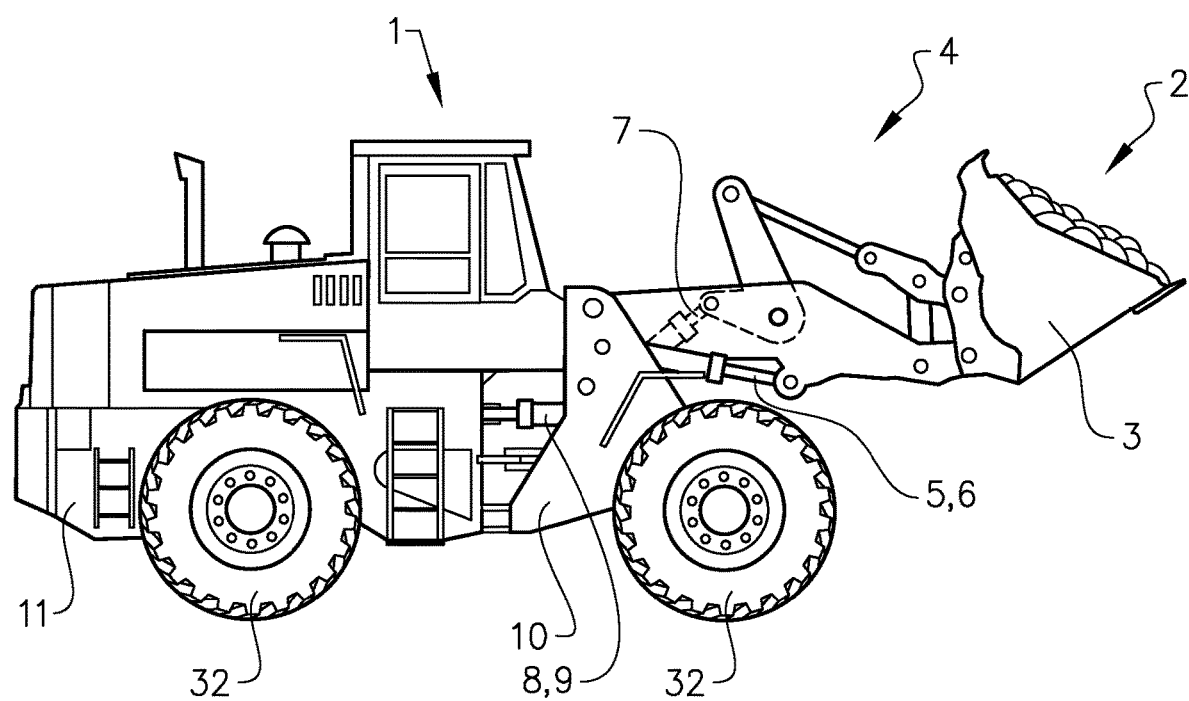
FIG. 1 is a lateral view illustrating a work machine having a power system according to the invention.

FIG. 1 is an illustration of a work machine 1 in the form of a wheel loader. The wheel loader is an example of a work machine for which the invention can be applied.

The wheel loader has an implement 2. The term "implement" is intended to comprise any kind of tool controlled by hydraulics, such as a bucket, a fork or a gripping tool. The implement illustrated is a bucket 3 which is arranged on a load arm 4 for lifting and lowering the bucket 3, and further the bucket can be pivoted or tilted relative to the load arm. In the example embodiment illustrated in FIG. 1, a hydraulic system of the wheel loader comprises two hydraulic cylinders 5, 6 for the operation of the load arm 4 and one hydraulic cylinder 7 for tilting the bucket 3 relative to the load arm 4.

The hydraulic system of the wheel loader further comprises two hydraulic cylinders 8, 9, steering cylinders, arranged on opposite sides of the wheel loader 1 for turning the wheel loader by means of relative movement of a front body part 10 and a rear body part 11.

In other words; the wheel loader is articulated frame-steered by means of the steering cylinders 8, 9. There is a pivot joint connecting the front body part 10 and the rear body part 11 of the wheel loader 1 such that these parts are pivotally connected to each other for pivoting about a substantially vertical axis.

Figure 2:
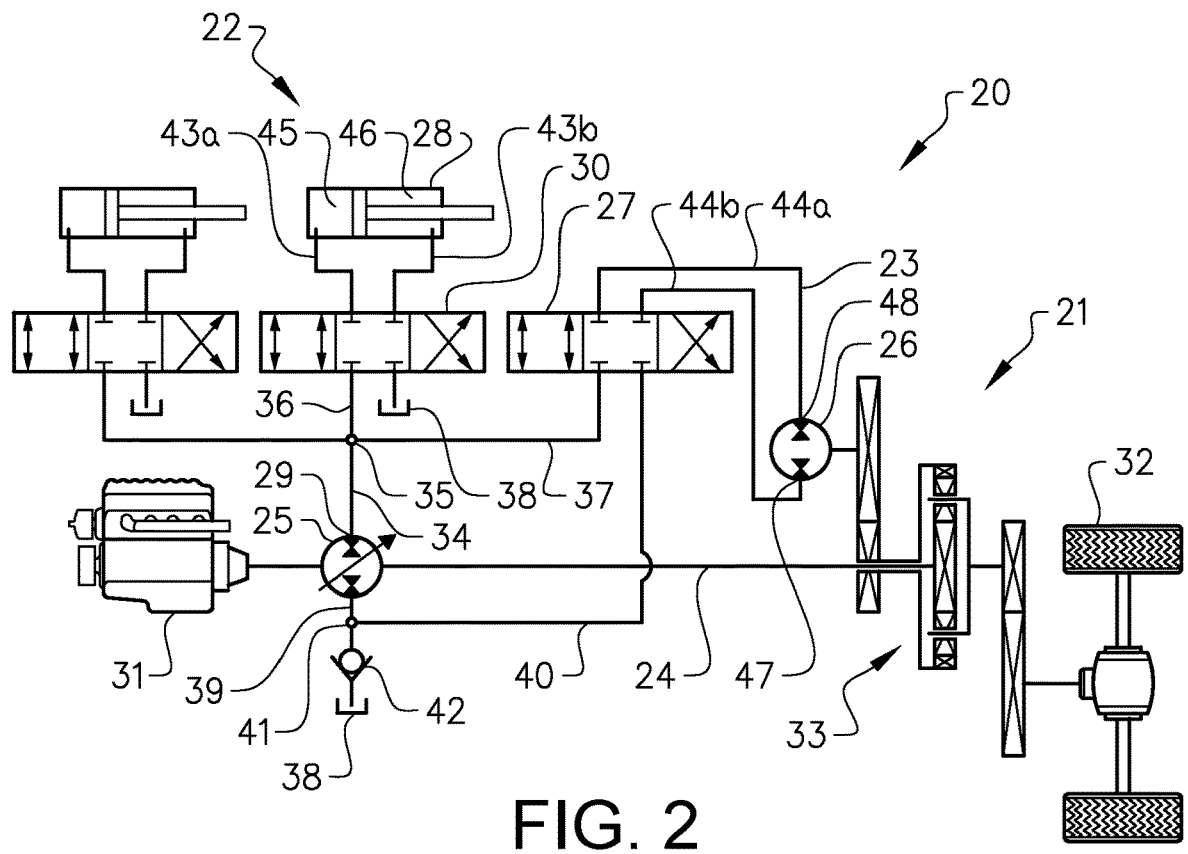
FIG. 2 shows a schematically illustrated power system according to the invention.

FIG. 2 is a schematic illustration of an example embodiment of a power system 20 according to the invention that can be used in a work machine 1.

The power system 20 comprises a power-split continuously variable transmission 21 for propulsion of the work machine and a hydraulic system 22 for work hydraulics. The power-split continuously variable transmission 21 has a hydrostatic branch 23 and a mechanical branch 24. The hydrostatic branch 23 comprises a first hydraulic machine 25 and a second hydraulic machine 26. The hydrostatic branch 23 further comprises a first control valve 27 fluidly connected to the first hydraulic machine 25 and to the second hydraulic machine 26 for controlling the flow of hydraulic fluid between the first hydraulic machine 25 and the second hydraulic machine 26. The hydraulic system 22 comprises at least one hydraulic actuator 28 fluidly connected to a first port 29 of the first hydraulic machine 25, and a second control valve 30 for controlling the flow of hydraulic fluid to said at least one hydraulic actuator 28.

By hydraulic fluid means hydraulic oil or any other corresponding fluid suitable for a hydraulic system.

As also illustrated in FIG. 2, the power system 20 suitably comprises a drive unit 31, such as an internal combustion engine (ICE), for driving the power-split continuously variable transmission and/or the work hydraulics. Although the power system illustrated herein is driven by an internal combustion engine, where the ICE is mechanically connected to the first hydraulic machine, in other embodiments the first hydraulic machine could be electrically driven.

Thus, the first hydraulic machine 25 is shared between the hydraulic system 22 for work hydraulics and the power-split continuously variable transmission 21. The first hydraulic machine 25 is driven by the drive unit 31. The second hydraulic machine 26 is mechanically connected to the mechanical branch 24 of the transmission 21. The drive unit 31 is also mechanically connected to the mechanical branch 24 of the transmission 21. The transmission 21 is in turn connected to the wheels 32 for propulsion of the work machine 1. See also FIG. 1. Hereinafter the main mechanical part of the transmission 21 will be called gearbox 33. The gearbox 33 may comprise a planetary gear set and other gear wheels for obtaining forward and reverse gears and together with the hydrostatic branch 23 the continuously variable range of gears.

In one example embodiment, the first hydraulic machine 25 is driven by the drive unit 31 and has a pump function, preferably with a variable displacement, for providing hydraulic fluid to the actuator 28 of the hydraulic system 22 via the second control valve 30. The second hydraulic machine 26 has a motor function and is driven by a hydraulic flow provided by the first hydraulic machine 25 via the first control valve 27. Hereby, the power from the drive unit 31 can be transmitted to the work hydraulics 22, and to the wheels via the second hydraulic machine 26 and/or directly via the mechanical branch 24.

Thus, in the example embodiment illustrated in FIG. 2, the first control valve 27 and the second control valve 30 are arranged in parallel to each other with respect to a flow of hydraulic fluid from the first port 29 of the first hydraulic machine 25. This can be achieved by a first hydraulic line 34 extending from the first port 29 of the first hydraulic machine 25 to a connection point 35, a second hydraulic line 36 extending from the connection point to the second control valve 30, and a third hydraulic line 37 extending from the connection point 35 to the first control valve 27.

In order to take care of a return flow from the actuator 28 and/or the second hydraulic machine 26 the control valves can also be connected to tank 38. As regards the second hydraulic machine 26, the first control valve 27 is however preferably connected to a second port 39 of the first hydraulic machine 25 for directing the return flow from the second hydraulic machine 26 to the suction side or low pressure side of the first hydraulic machine 25 instead of tank 38. A hydraulic line 40 extending from the first control valve 27 to the second port 39 of the first hydraulic machine 25 is arranged for this purpose. Since the second port 39 of the first hydraulic machine 25 is suitably fluidly connected to tank 38, this hydraulic line 40 is preferably connected at a position 41 between the second port 39 of the first hydraulic machine 25 and tank 38, where a non-return valve 42 is arranged between the connection point 41 and tank 38 for allowing flow only in the direction from the tank 38 towards the connection point 41.

In addition, hydraulic lines 43a, 43b are arranged between the second control valve 30 and the actuator 28, and hydraulic lines 44a, 44b are arranged between the first control valve 27 and the second hydraulic machine 26. For example, the actuator 28 can be a hydraulic cylinder and a hydraulic line 43a can be arranged between the second control valve 30 and the piston side 45 of a hydraulic cylinder, and a further hydraulic line 43b can be arranged between the second control valve 30 and the piston rod side 46 of the hydraulic cylinder. Furthermore, a hydraulic line 44b is suitably arranged between the first control valve 27 and a first port 47 of the second hydraulic machine 26, and a further hydraulic line 44a is suitably arranged between the first control valve 27 and a second port 48 of the second hydraulic machine 26.

As will be described hereinbelow, the first hydraulic machine 25 and the second hydraulic machine 26 can be designed and used in many ways to obtain a flexible power system enabling several different power flows adapted to different operation conditions of the work machine.

Figure 3:
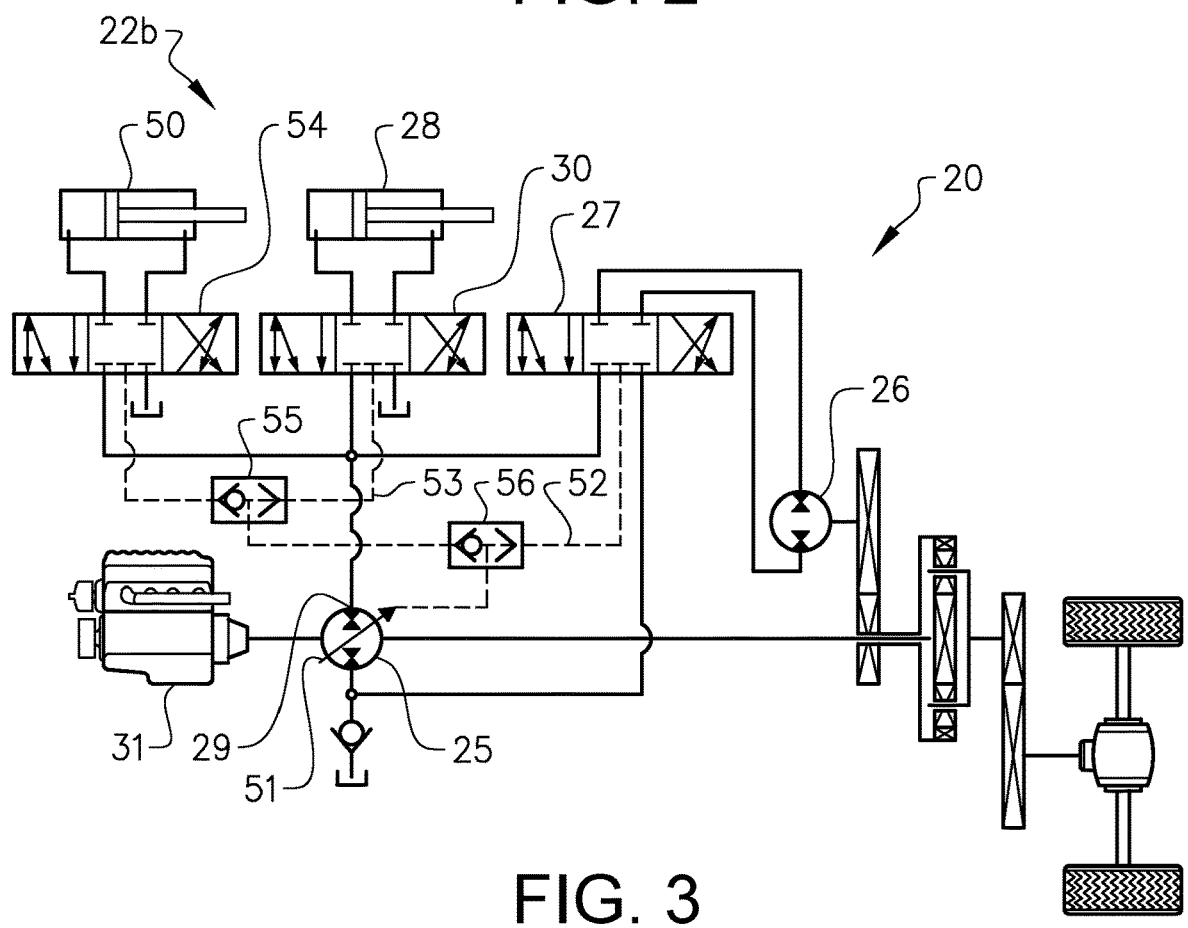
FIG. 3 shows a further embodiment of the power system according to the invention.

FIG. 3 shows a variant of the power system illustrated in FIG. 2. In this example embodiment the hydraulic system 22b is a load sensing (LS) system.

For some features of the power system 20 already described in connection with previous example embodiments, reference is made also to FIG. 2. Hereinafter, mainly features and functions unique for this example embodiment will be described in detail. Same reference numerals used in different figures will indicate same or similar components as already described with reference to FIG. 2. Such components will only be briefly described or not described at all.

A load sensing system usually comprises a variable pump for supplying the functions with hydraulic fluid via a control valve. The pump is suitably controlled based on the highest LS-signal from a function that is active and thus has the highest load pressure. The pump will then provide the hydraulic system with a pressure that is higher than the highest load pressure, i.e. a pressure that is the load pressure plus an offset, which offset can be approximately 15-30 bar, for instance.

In the example embodiment illustrated in FIG. 3, in addition to the actuators 28, 50 the second hydraulic machine 26 is arranged as a load within the LS-system with respect to the first hydraulic machine 25. The first hydraulic machine 25 is preferably provided with a variable displacement 51, whereas the second hydraulic machine 26 can be provided with a fixed displacement, since the hydraulic flow to the second hydraulic machine 26 can be controlled by means of the first control valve 27.

The hydraulic system 22b comprises a first circuit 52 for providing an LS-pressure for the second hydraulic machine 26 and a second circuit 53 for providing an LS-pressure for said at least one hydraulic actuator 28. The LS-pressures are provided for controlling the pump pressure at the first port 29 of the first hydraulic machine 25. For example, the first and second circuits 52, 53 can be hydraulic circuits where the load pressure from the actuator and the second hydraulic machine 26 are compared and the highest pressure of these pressures is used for controlling the first hydraulic machine 25.

In the example embodiment illustrated in FIG. 3, the hydraulic system 22b comprises a first actuator 28 and a second actuator 50, and each actuator 28, 50 has a control valve 30, 54 for controlling the flow of hydraulic fluid to the respective hydraulic actuator 28, 50.

Then, a first LS-pressure for the first actuator 28 and a second LS-pressure for the second actuator 50 are compared with each other by means of a comparison means 55, such as a shuttle valve. The highest pressure of these two LS-pressures is then compared to the LS-pressure for the second hydraulic machine 26 by means of a further comparison means 56, and the highest pressure of these two LS-pressures is then used for controlling the pump pressure of the first hydraulic machine 25.

As already indicated herein, the number of actuators 28, 50 can be varied as well as the type of actuator. The actuators can be used for lifting or tilting an implement of the work machine or for steering the work machine, for instance. Thus, the actuators can for example constitute one or more of the hydraulic cylinders 5, 6, 7, 8, and 9 illustrated in FIG. 1 where the work machine 1 is exemplified by a frame-steered wheel loader.

Although in the following description hereinbelow, a power system where both the first hydraulic machine 25 and the second hydraulic machine 26 each constitutes a combined hydraulic pump and motor for providing a pump as well as a motor function depending on the operation conditions, and suitably both hydraulic machines are also provided with a design enabling hydraulic flow in two opposite directions, preferably such that a motor function or a pump function can be achieved for a first flow direction as well as for a second opposite flow direction, the design of the hydraulic machines could of course be adapted to the current application.

The power systems illustrated in FIGS. 2 and 3 enable four main operating conditions with respect to the second hydraulic machine.

Figure 4A:
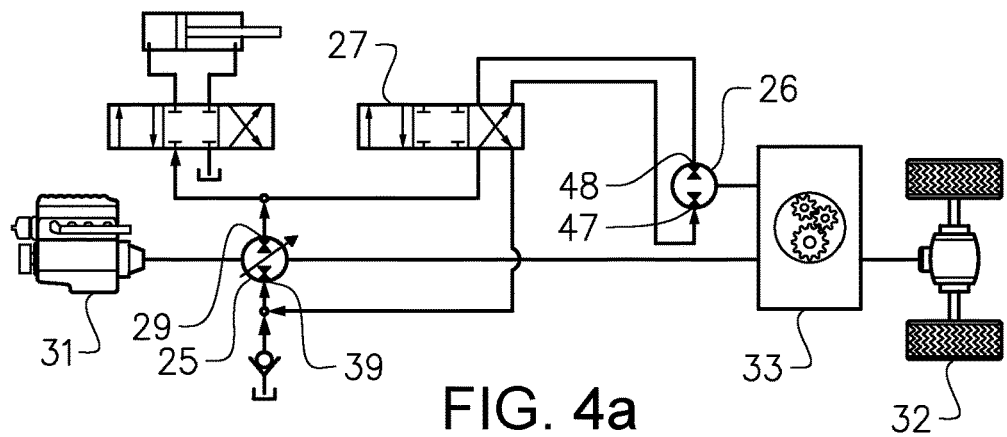
FIG. 4a shows a power system while driving the work machine in the forward direction and the second hydraulic machine works as a motor.

In FIG. 4a the power system drives the work machine in a first direction, for example the forward direction. The second hydraulic machine 26 functions as a motor transmitting power to the gearbox 33. Hydraulic fluid flows from the first port 29 of the first hydraulic machine 25 via the first control valve 27 to the first port 47 of the second hydraulic machine 26, and the return flow is directed from the second port 48 of the second hydraulic machine 26 via the first control valve 27 back to the second port 39 of the first hydraulic machine 25.

Figure 4B:
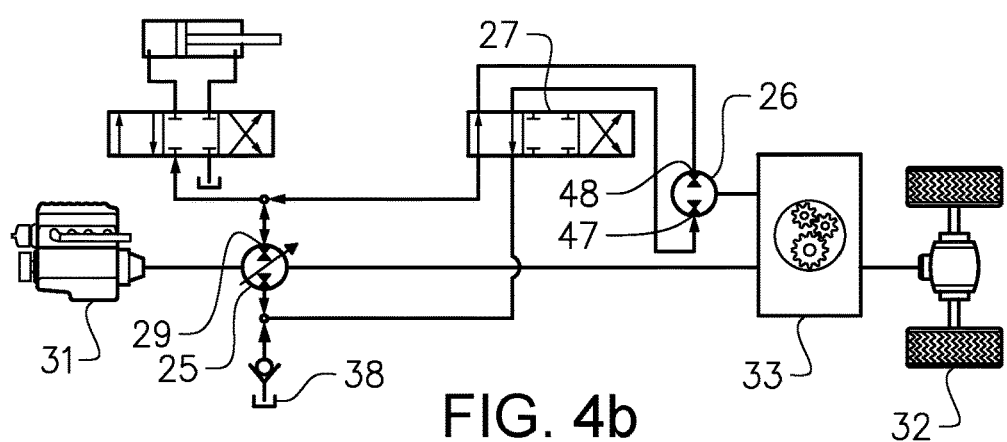
FIG. 4b shows a power system while driving the work machine in the forward direction and the second hydraulic machine works as a pump.

In FIG. 4b the power system drives the work machine in the first direction. Power is transmitted from the drive unit 31 directly to the gear box 33. Power is also transmitted from the gearbox to the second hydraulic machine 26 which thus functions as a pump. Hydraulic fluid flows from the second port 48 of the second hydraulic machine 26 via the first control valve 27 to the first port 29 of the first hydraulic machine 25, and from tank 38 via the first control valve 27 to the first port 47 of the second hydraulic machine 26.

Figure 4C:
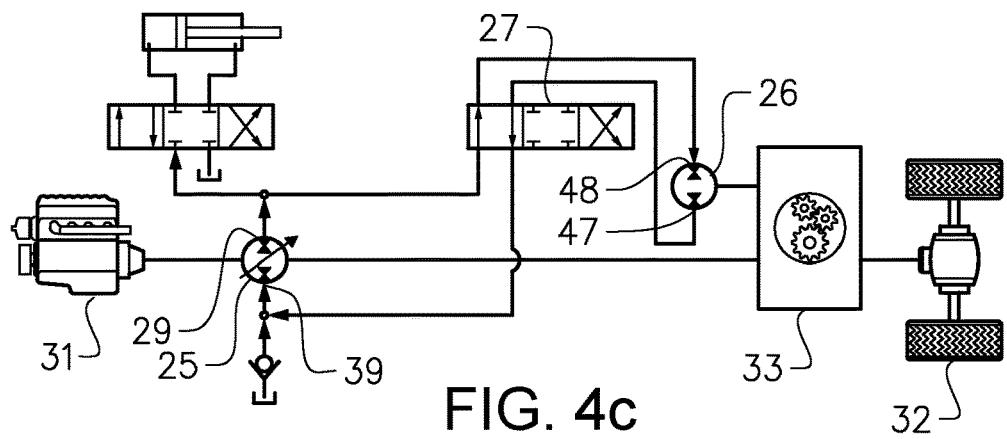
FIG. 4c shows a power system while driving the work machine in the reverse direction and the second hydraulic machine works as a motor.

In FIG. 4c the power system drives the work machine in a second direction opposite to the first direction, for example the reverse direction. The second hydraulic machine 26 functions as a motor transmitting power to the gearbox 33. Hydraulic fluid flows from the first port 29 of the first hydraulic machine 25 via the first control valve 27 to the second port 48 of the second hydraulic machine 26, and the return flow is directed from the first port 47 of the second hydraulic machine 26 via the first control valve 27 back to the second port 39 of the first hydraulic machine 25.

Figure 4D:
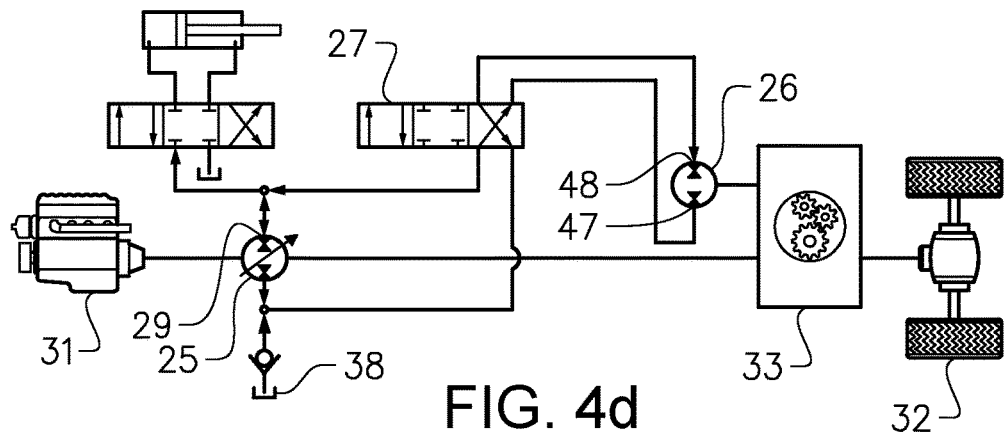
FIG. 4d shows a power system while driving the work machine in the reverse direction and the second hydraulic machine works as a pump.

In FIG. 4d the power system drives the work machine in the second direction. Power is transmitted from the drive unit 31 directly to the gearbox 33. Power is also transmitted from the gearbox 33 to the second hydraulic machine 26 which thus functions as a pump. Hydraulic fluid flows from the first port 47 of the second hydraulic machine 26 via the first control valve 27 to the first port 29 of the first hydraulic machine 25, and from tank 38 via the first control valve 27 to the second port 48 of the second hydraulic machine 26.

In FIGS. 5a-5d, 6a-6d, and 7a-7d, different possible power flows are illustrated. For each of the operating conditions "Driving+ Lifting", "Braking+ Lifting" and "Driving+ Lowering" of the work machine, four different modes "Negative circulating mode", "Additive mode", "Positive circulating mode" and "Full mechanical mode" are described. It should be stressed that these operating conditions are non-exhaustive examples.

Driving+ Lifting

Figure 5A:
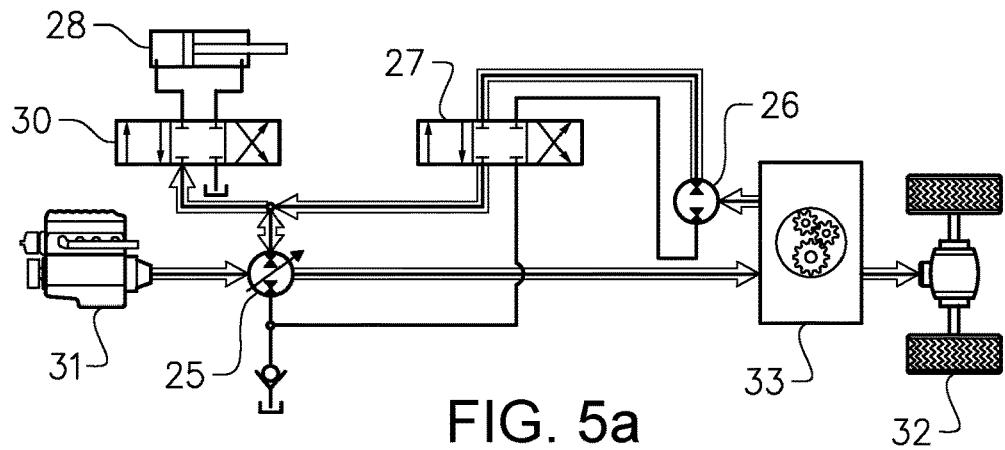
FIG. 5a-d show a power system, and different possible power flows for the operating condition "Driving+ Lifting"

FIG. 5a shows "Negative circulating mode" where power is mechanically transmitted from the drive unit 31 directly to the gearbox 33 and further to the wheels 32. Power is also transferred from the gearbox 33 via the second hydraulic machine 26 and the first control valve 27 to the hydraulic system. This power from the gearbox 33 is then partly or entirely transferred via the second control valve 30 to the actuator 28. Depending on the power needed for lifting, additional power can be transferred from the drive unit 31 via the first hydraulic machine 25 to the actuator 28 or power can be transferred in the opposite direction from the second hydraulic machine 26 to the first hydraulic machine 25.

Figure 5B:
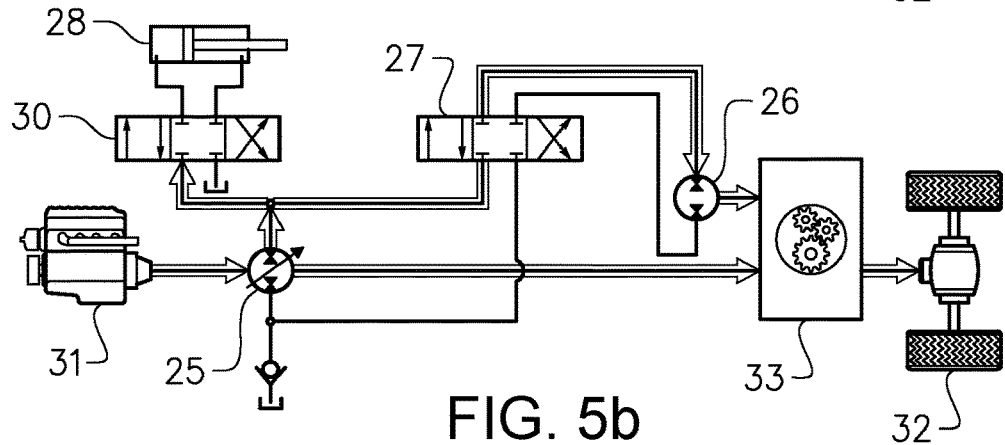

FIG. 5b shows "Additive mode" where power is mechanically transmitted from the drive unit 31 directly to the gearbox 33 and further to the wheels 32. Power is also transferred from the drive unit 31 via the first hydraulic machine 25 and the first control valve 27 to the second hydraulic machine 26 and further to the gearbox 33 and the wheels 32. In addition, power is transferred from the first hydraulic machine 25 via the second control valve 30 to the actuator 28.

Figure 5C:
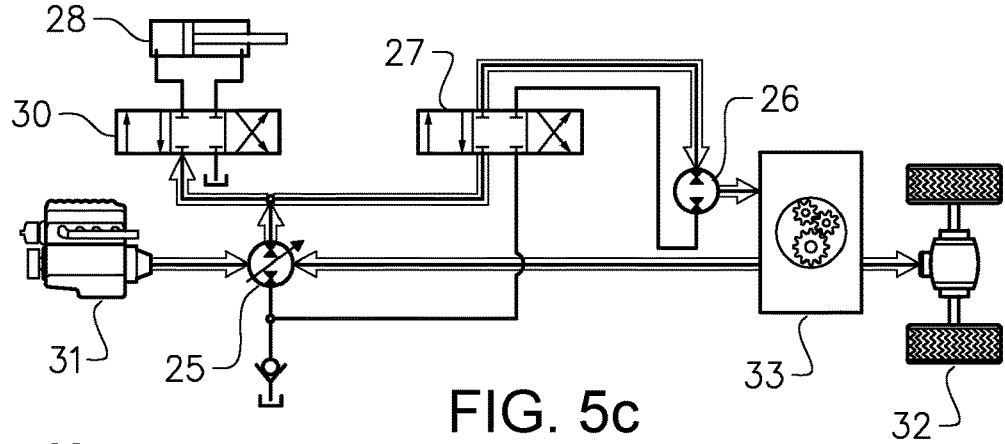

FIG. 5c shows "Positive circulating mode" where power is transferred from the drive unit 31 via the first hydraulic machine 25 and the first control valve 27 to the second hydraulic machine 26 and further to the gearbox 33 and the wheels 32. Power is also transferred from the first hydraulic machine 25 via the second control valve 30 to the actuator 28. Some power from the gearbox 33 can be mechanically transmitted back to the first hydraulic machine 25.

Figure 5D:
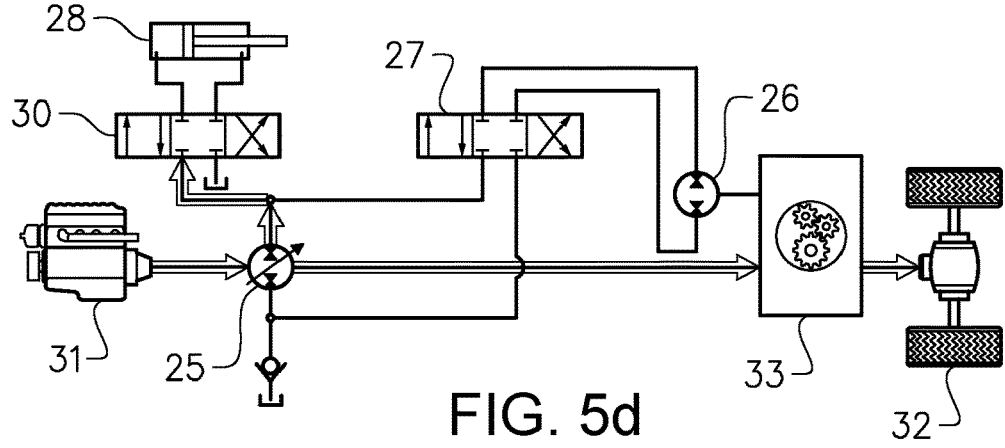

FIG. 5d shows "Full mechanical mode" where power is mechanically transmitted from the drive unit 31 directly to the gearbox 33 and further to the wheels 32. Power is also transferred from the drive unit 31 via the first hydraulic machine 25 and the second control valve 30 to the actuator 27.

Braking+ Lifting

Figure 6A:
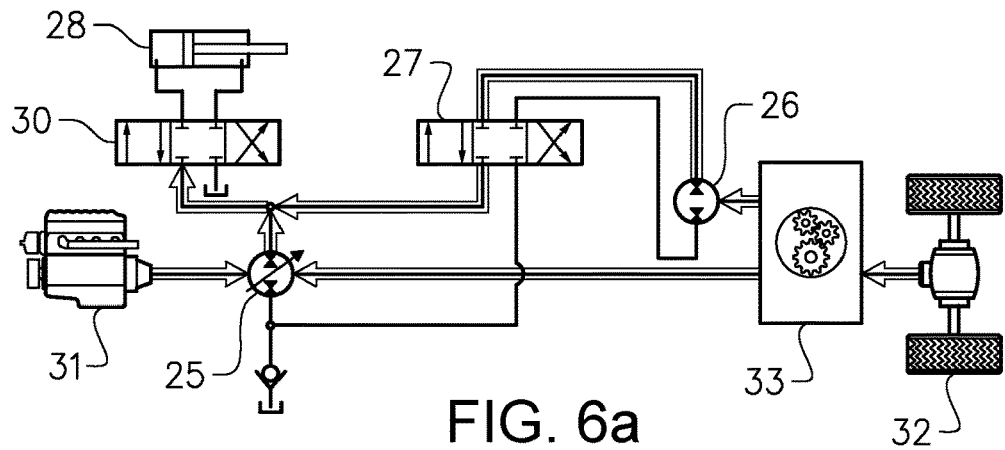
FIG. 6a-d show a power system, and different possible power flows for the operating condition "Braking+ Lifting"

FIG. 6a shows "Negative circulating mode" where power is mechanically transmitted from the wheels 32 and the gearbox 33 directly to the first hydraulic machine 25. Power is also transferred from the gearbox 33 via the second hydraulic machine 26 and the first control valve 27 to the hydraulic system. The power from the second hydraulic machine 26 is then transferred via the second control valve 30 to the actuator 28. Depending on the power needed for lifting, additional power can be transferred from the first hydraulic machine 25 via the second control valve 30 to the actuator 28. In addition, power can be transmitted from the drive unit 31 to the first hydraulic machine 25.

Figure 6B:
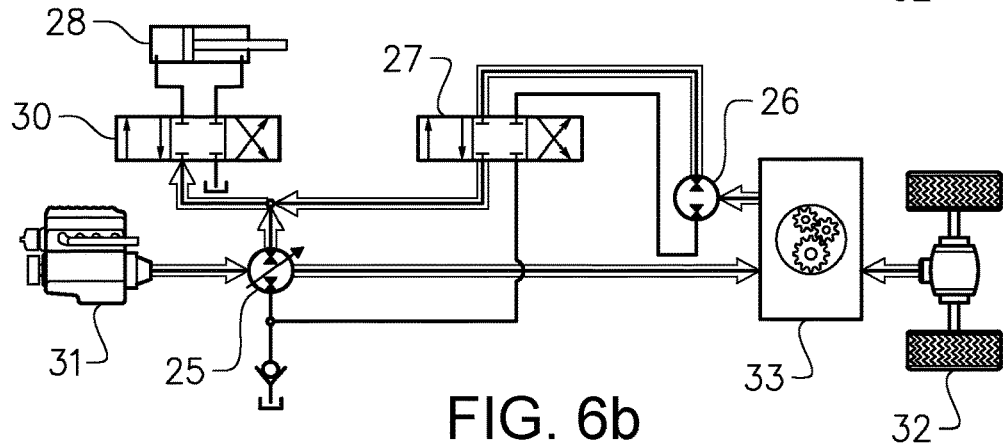

FIG. 6b shows "Additive mode" where power is mechanically transmitted from the drive unit 31 directly to the gearbox 33. Power is also transmitted from the wheels 32 to the gearbox 33. Furthermore, power is transferred from the gearbox 33 via the second hydraulic machine 26 and the first control valve 27 to the hydraulic system and further to the actuator 28 via the second control valve 30. In addition, power is transferred from the drive unit 31 via the first hydraulic machine 25 and the second control valve 30 to the actuator 28.

Figure 6C:
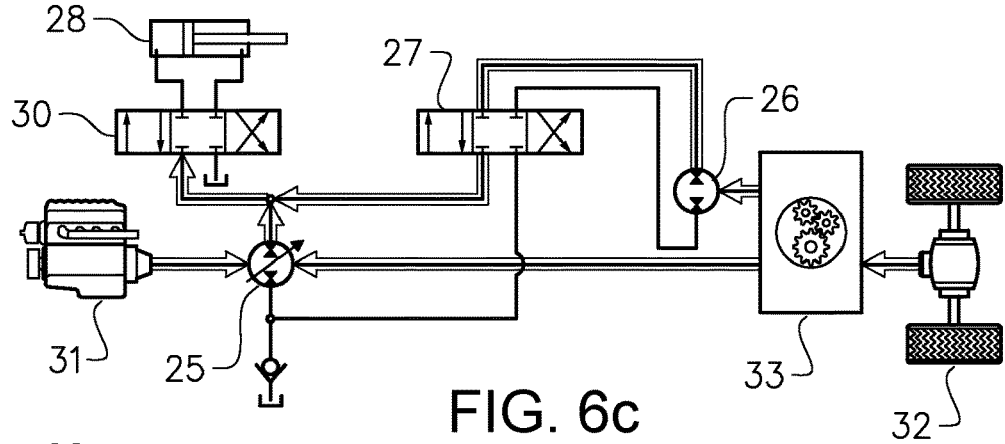

FIG. 6c shows "Positive circulating mode" where power is mechanically transmitted from the wheels 32 to the gearbox 33 and from the gearbox 33 directly to the first hydraulic machine 25. Power is also transferred from the gearbox 33 via the second hydraulic machine 26 and the first control valve 27 to the hydraulic system and further to the actuator 28 via the second control valve 30. In addition, power is transferred from the drive unit 31 via the first hydraulic machine 25 and the second control valve 30 to the actuator 28.

Figure 6D:
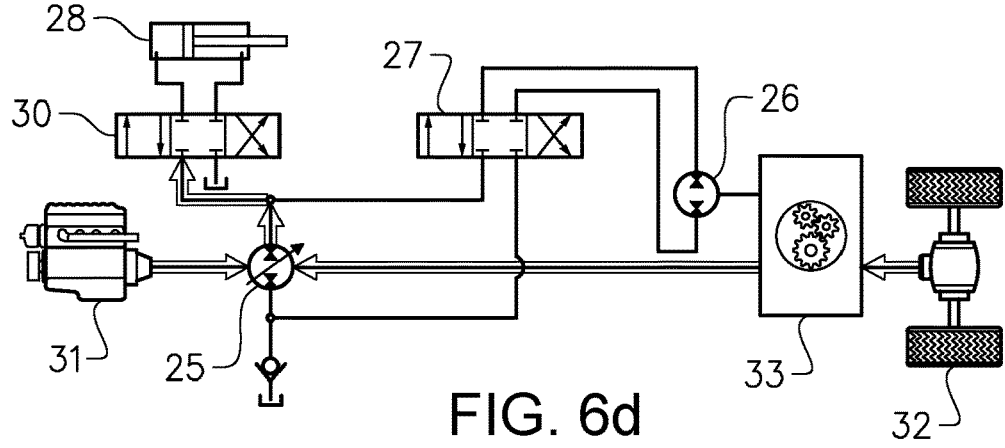

FIG. 6*d* shows "Full mechanical mode" where power is mechanically transmitted from the wheels 32 to the gearbox 33 and then from the gearbox 33 directly to the first hydraulic machine 25. Power is also transmitted from the drive unit 31 to the first hydraulic machine 25. The power is further transferred from the first hydraulic machine 25 via the second control valve 30 to the actuator 28.

Driving+ Lowering

Figure 7A:
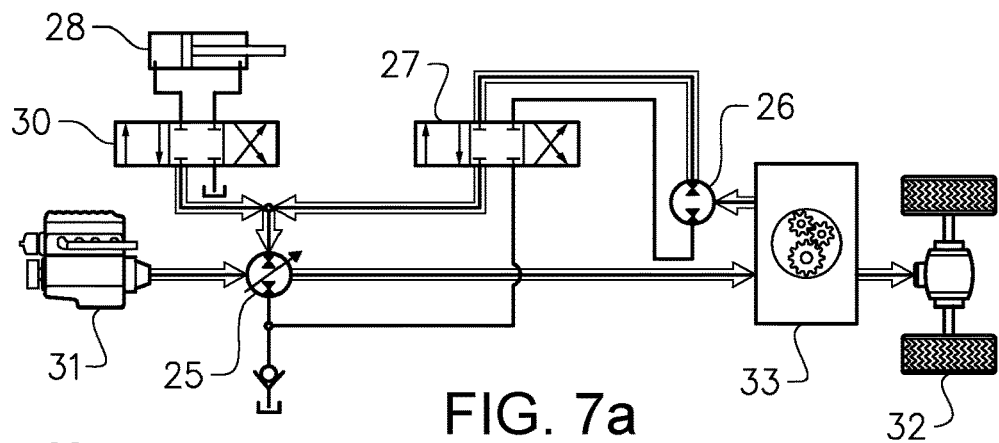
FIG. 7a-d show a power system, and different possible power flows for the operating condition "Driving+ Lowering"

FIG. 7*a* shows "Negative circulating mode" where power is mechanically transmitted from the drive unit 31 directly to the gearbox 33 and further to the wheels 32. Power is also transferred from the gearbox 33 via the second hydraulic machine 26 and the first control valve 27 to the hydraulic system. The power from the second hydraulic machine 26 is transferred to the first hydraulic machine 25. In addition, recovered power from the actuator 28 is transferred via the second control valve 30 to the first hydraulic machine 25.

Figure 7B:
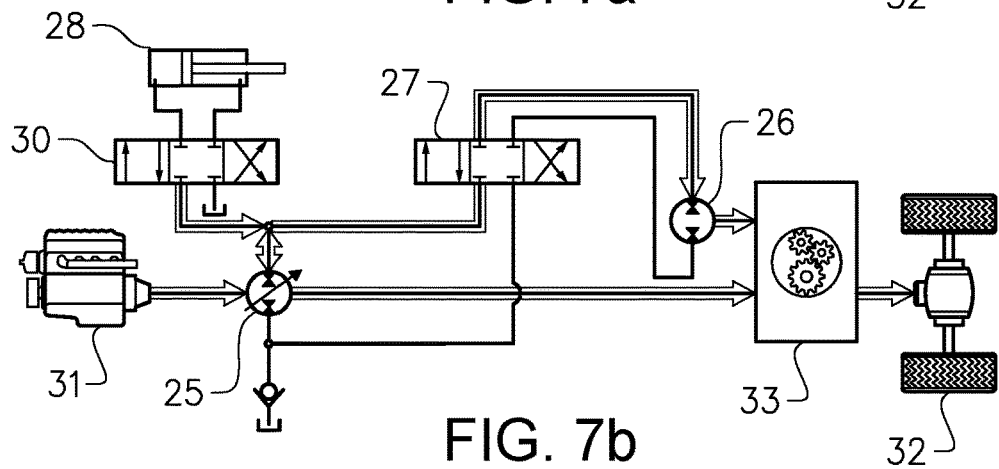

FIG. 7*b* shows "Additive mode" where power is mechanically transmitted from the drive unit 31 directly to the gearbox 33. Power is also transferred from the hydraulic system via the first control valve 27 to the second hydraulic machine 26 and further to the gearbox 33. From the gearbox 33, power is transmitted to the wheels 32. Depending on the power recovered from the actuator 28, power can be transferred from the first hydraulic machine via the first control valve 27 to the second hydraulic machine 26 or power can be transferred in the opposite direction from the actuator 28 via the second control valve 30 to the first hydraulic machine 25.

Figure 7C:
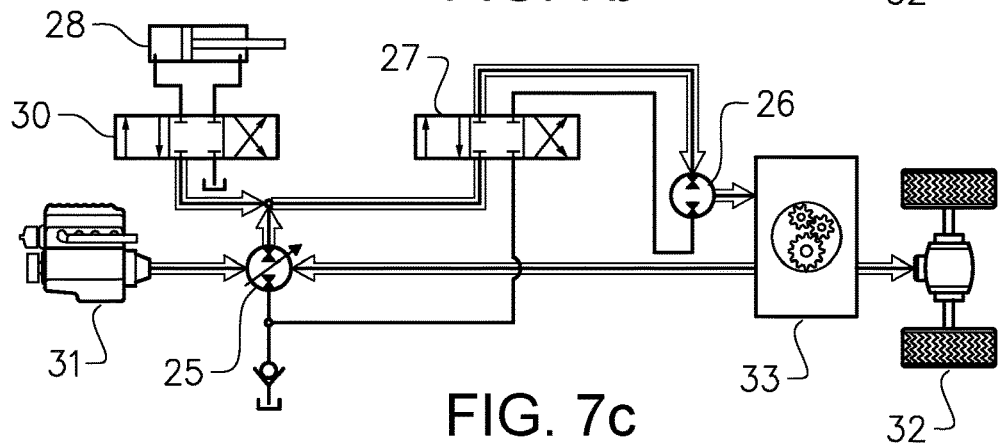

FIG. 7*c* shows "Positive circulating mode" where power is transferred from the drive unit 31 via the first hydraulic machine 25 and the first control valve 27 to the second hydraulic machine 26. The power is then transmitted from the second hydraulic machine 26 to the gearbox 33 and further to the wheels 32. Power can also be transmitted from the gearbox 33 to the first hydraulic machine 25. In addition, power recovered from the actuator 28 is transferred via the second control valve 30 and the first control valve 27 to the second hydraulic machine 26.

Figure 7D:
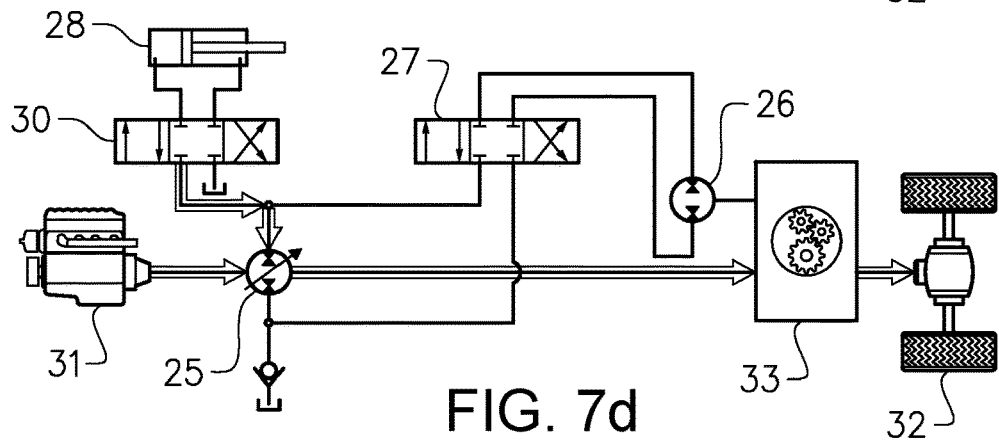

FIG. 7*d* shows "Full mechanical mode" where power is mechanically transmitted from the drive unit 31 directly to the gearbox 33 and further to the wheels 32. Power is also recovered and transferred from the actuator 28, via the second control valve 30, to the first hydraulic machine 25. The power from the actuator 28 is then mechanically transmitted to the gearbox 33 and the wheels 32.

Figure 8:
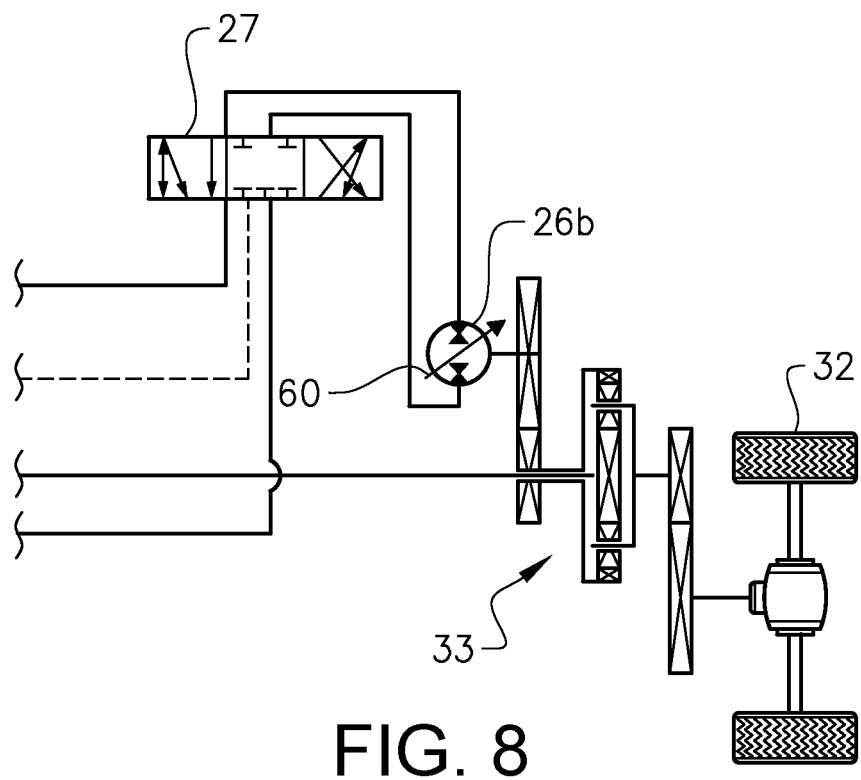
FIG. 8 shows a further embodiment of the power system according to the invention.

FIG. 8 shows a variant of the power system illustrated in FIGS. 2 and 3. In this example embodiment the second hydraulic machine 26*b* has a variable displacement 60. The variable displacement 60 implies that the pressure level is less critical and can be adapted to the work hydraulics since the power to be transferred by the second hydraulic machine 26*b* to the gearbox 33 can be reached for different pressure levels by adjusting the displacement 60. The displacement adjustment possibilities due to the variable displacement 60 will decrease the need of a pressure drop over the first control valve 27 and thus the heat losses over the first control valve 27 can be reduced.

Figure 9A:
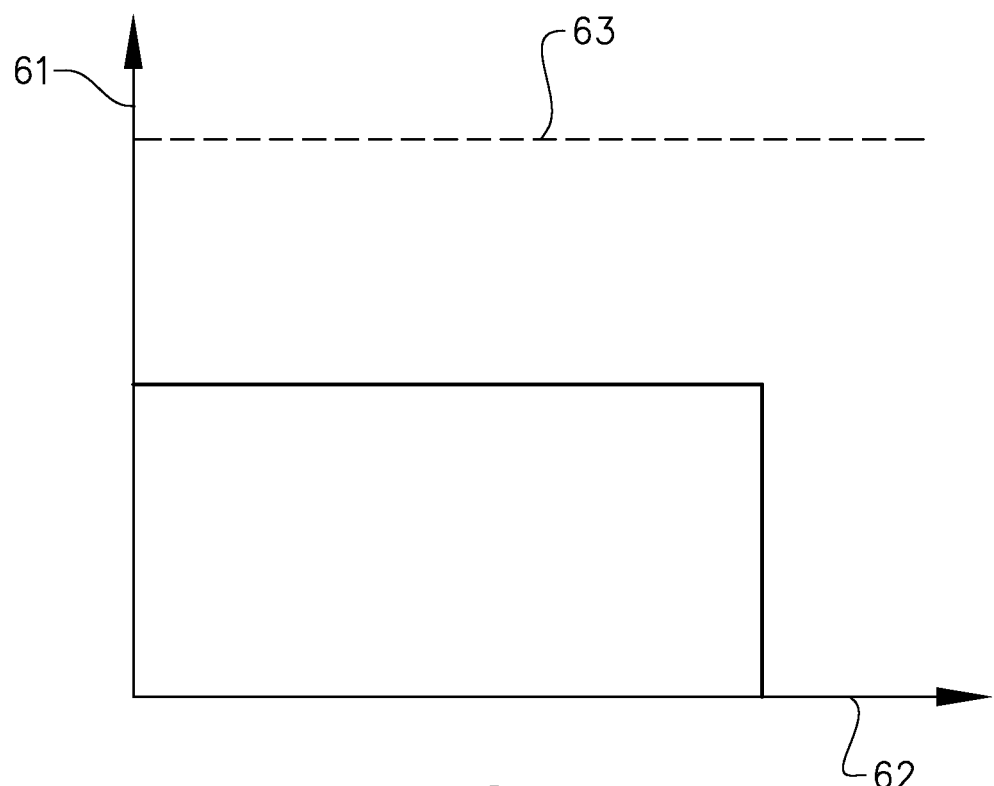
FIG. 9a-c are charts illustrating pump pressure versus flow through the second hydraulic machine for different pressure levels for a power system according to FIG. 8.
Figure 9B:
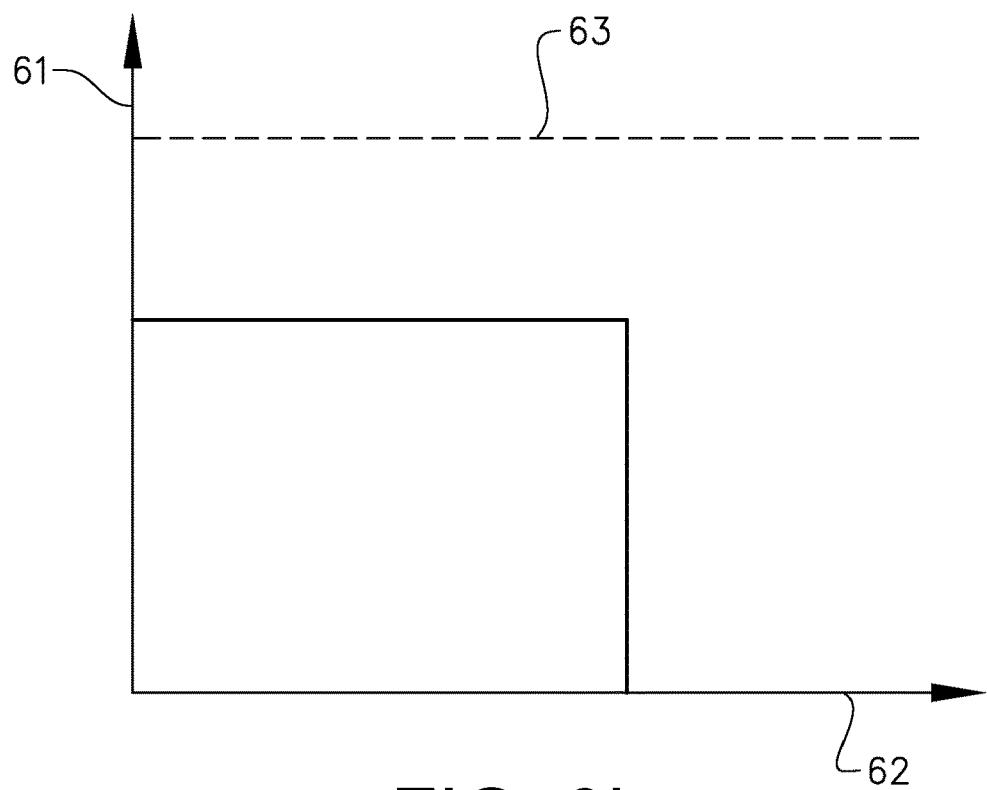
Figure 9C:
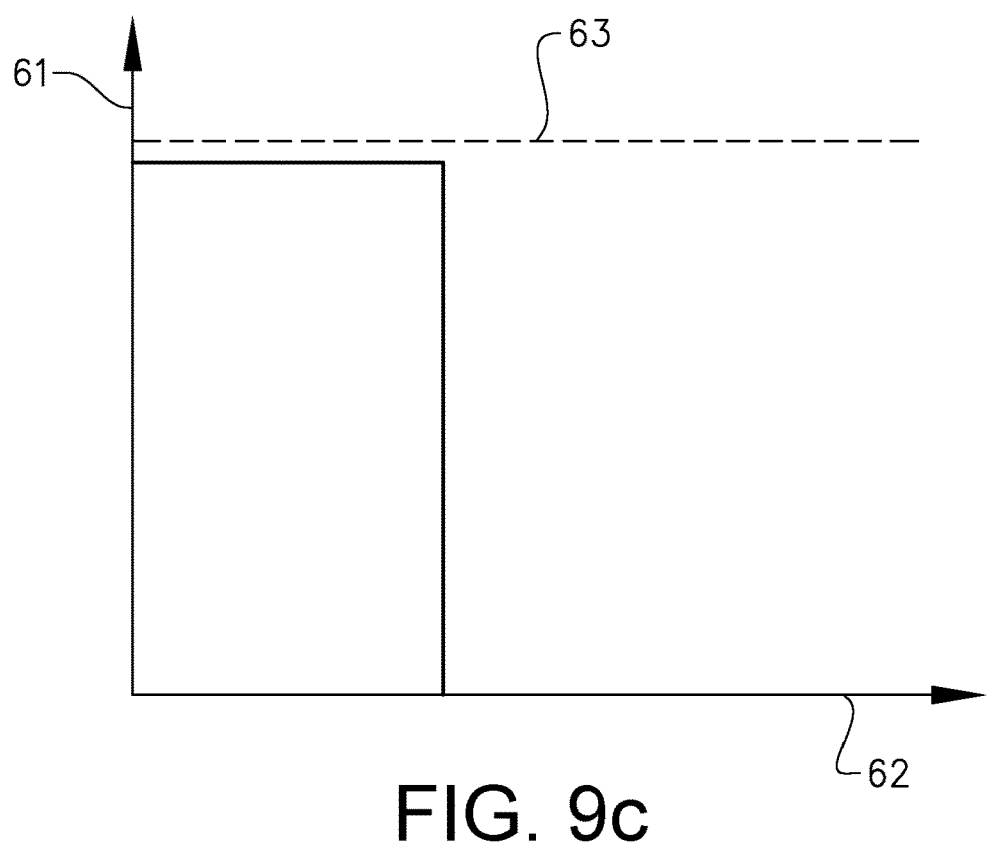

In FIGS. 9*a*-9*c* the pump pressure 61 from the first hydraulic machine 25 provided to the second hydraulic machine 26*b* versus the hydraulic flow 62 through the second hydraulic machine 26*b* is illustrated. As can be seen from FIGS. 9*a*-9*c* if the pump pressure 61 is relatively low, the flow 62 can be increased by adjusting the displacement 60 of the second hydraulic machine 26*b*, and if the pressure is relatively high, the flow 62 can be decreased by means of adjusting the displacement 60, thereby maintaining the power since the pump pressure 61 multiplied with the flow 62 gives the power transferred by the second hydraulic machine 26*b*. This can be performed within the maximal pump pressure that can be determined by an LS-pressure 63 demanded from the work hydraulics.

Figure 10:
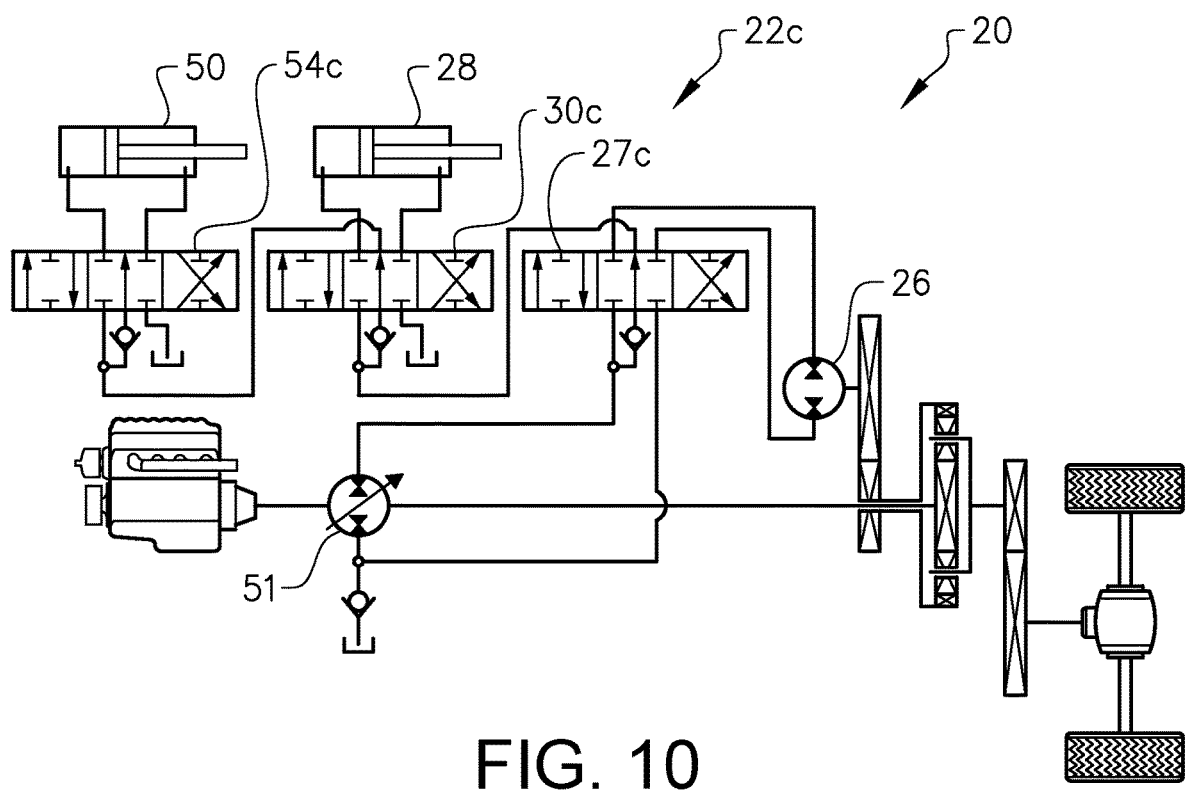
FIG. 10 shows a further embodiment of the power system according to the invention.

FIG. 10 shows a variant of the power system illustrated in FIG. 2. In this example embodiment the hydraulic system 22*c* is a flow controlled hydraulic system, exemplified by an open-centre system.

For some features of the power system 20 already described in connection with previous example embodiments, reference is made also to FIG. 2. Hereinafter, mainly features and functions unique for this example embodiment will be described in detail. Same reference numerals used in different figures will indicate same or similar components as already described with reference to FIG. 2. Such components will only be briefly described or not described at all.

The open-centre system comprises a first hydraulic machine 25 for supplying the functions with hydraulic fluid via control valves.

In the example embodiment illustrated in FIG. 10, in addition to the actuators 28, 50 the second hydraulic machine 26 is connected to the first hydraulic machine 25 via the first control valve 27*c*. The first hydraulic machine 25 is preferably provided with a variable displacement 51, whereas the second hydraulic machine 26 can be provided with a fixed displacement, since the hydraulic flow to the second hydraulic machine 26 can be controlled by means of the first control valve 27*c*.

In the example embodiment illustrated in FIG. 10, the hydraulic system 22*c* comprises a first actuator 28 and a second actuator 50, and each actuator 28, 50 has a control valve 30*c*, 54*c* for controlling the flow of hydraulic fluid to the respective hydraulic actuator 28, 50. These control valves 30*c*, 54*c* and the first control valve 27*c* are arranged in series.

As already indicated herein, the number of actuators 28, 50 can be varied as well as the type of actuator. The actuators can be used for lifting or tilting an implement of the work machine or for steering the work machine, for instance. Thus, the actuators can for example constitute one or more of the hydraulic cylinders 5, 6, 7, 8, and 9 illustrated in FIG. 1 where the work machine 1 is exemplified by a frame-steered wheel loader.

It is to be understood that the present invention is not limited to the embodiments described above and illustrated in the drawings; rather, the skilled person will recognize that many changes and modifications may be made within the scope of the appended claims. For example, the invention is not limited to power systems having a power-split continuously variable transmission designed as an "input-coupled" power-split configuration as shown in the figures, but the PS-CVT could also be designed with an "output-coupled" or "compound" power-split configuration.

The invention claimed is:

1. A power system for a work machine, the power system comprising:
    a power-split continuously variable transmission for propulsion of the work machine; and
    a hydraulic system for work hydraulics,
    the power-split continuously variable transmission having a hydrostatic branch and a mechanical branch, the hydrostatic branch comprising a first hydraulic machine and a second hydraulic machine, wherein:

the hydrostatic branch comprises a first control valve fluidly connected to the first hydraulic machine and to the second hydraulic machine for controlling a flow of hydraulic fluid between the first hydraulic machine and the second hydraulic machine, and the hydraulic system comprises at least one hydraulic actuator fluidly connected to a first port of the first hydraulic machine, and a second control valve for controlling the flow of hydraulic fluid to said at least one hydraulic actuator, wherein the hydraulic system is a load sensing (LS) system and further comprises a first circuit for providing an LS-pressure for the second hydraulic machine and a second circuit for providing an LS-pressure for said at least one hydraulic actuator, the LS-pressures being provided for controlling a pump pressure of the first hydraulic machine.

2. A power system according to claim 1, wherein the first control valve and the second control valve are arranged in parallel to each other with respect to a flow of hydraulic fluid from the first port of the first hydraulic machine.

3. A power system according to claim 2, wherein the power system comprises a first hydraulic line extending from the first port of the first hydraulic machine to a connection point, and a second hydraulic line extending from the connection point to the second control valve, and a third hydraulic line extending from the connection point to the first control valve.

4. A power system according to claim 1, wherein the power system comprises a hydraulic line extending from the first control valve to a second port of the first hydraulic machine.

5. A power system according to claim 1, wherein the first hydraulic machine has a pump function.

6. A power system according to claim 1, wherein the second hydraulic machine has a motor function.

7. A power system according to claim 1, wherein the first hydraulic machine is a combined hydraulic motor and pump.

8. A power system according to claim 1, wherein the second hydraulic machine is a combined hydraulic motor and pump.

9. A power system according to claim 1, wherein the first hydraulic machine enables hydraulic flow in two opposite directions.

10. A power system according to claim 1, wherein the second hydraulic machine enables hydraulic flow in two opposite directions.

11. A power system according to claim 1, wherein the first hydraulic machine has a variable displacement.

12. A power system according to claim 1, wherein the second hydraulic machine has a fixed displacement.

13. A power system according to claim 1, wherein the second hydraulic machine has a variable displacement.

14. A power system according to claim 1, wherein said at least one hydraulic actuator is arranged for lifting or tilting an implement of the work machine.

15. A power system according to claim 1, wherein the hydraulic system comprises two or more hydraulic actuators and one control valve for each hydraulic actuator, the control valves being arranged for controlling a flow of hydraulic fluid to the respective hydraulic actuator.

16. A power system according to claim 1, wherein the power system comprises a drive source for driving the power-split continuously variable transmission and/or the hydraulic system.

17. A power system according to claim 1, wherein the hydraulic system is a flow controlled hydraulic system.

18. A power system according to claim 17, wherein the hydraulic system is an open-centre hydraulic system.

19. A work machine comprising a power system according to claim 1.

* * * * *